Aug. 17, 1926.
E. H. LANGBEIN
1,596,277
DETACHABLE BLADE KNIFE
Filed August 16, 1924
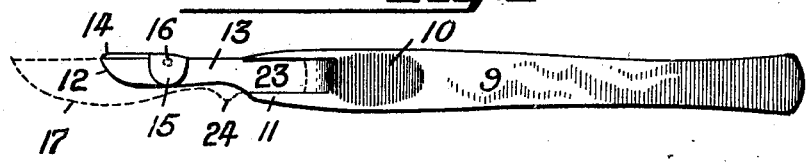
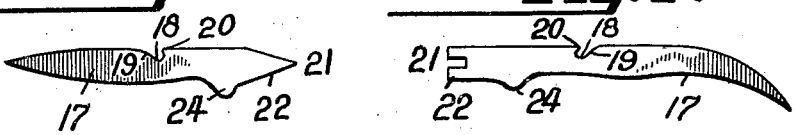
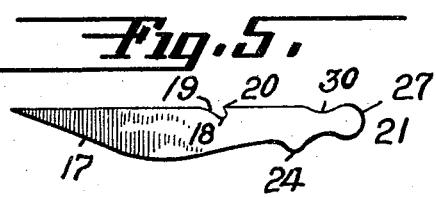
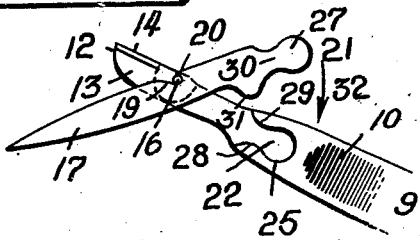
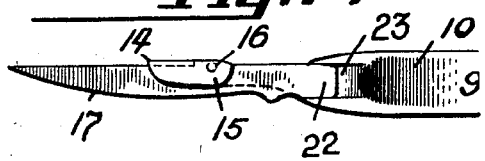
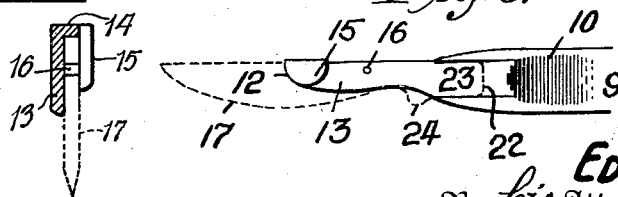
Inventor
EDWARD H. LANGBEIN.
By his Attorney Patented Aug. 17, 1926.

1,596,277

UNITED STATES PATENT OFFICE.

EDWARD H. LANGBEIN, OF BROOKLYN, NEW YORK.

DETACHABLE-BLADE KNIFE.

Application filed August 16, 1924. Serial No. 732,438.

My invention relates to detachable blade knives, and more particularly to the construction of the device whereby the flexible blade may be detachably held to the handle as to preclude accidental detachment of the blade from the handle, or the movement of the blade in any direction even to the slightest degree while the same is locked therein.

My invention is an improvement on the design of knife granted me March 15th 1923, Patent Number 1,448,305, in which interchangeable blades were suitably locked to the handle by means of buttons, thereby causing a saving to the surgeon in the number of knives that he has to have, and at the same time in the saving in weight that he would have to carry around.

Another object of this invention is to provide a handle adapted to receive a flexible knife blade of a desired design, with simple and efficient means for attaching and detaching the blade from the handle, first, by the very easy yet secure method of securing and releasing the blade from the handle, and secondly, by the construction of a handle with a lock that is adapted to hold the blade secure therewith.

Another object of the invention is to provide handles adapted to receive and hold detachable blades which may vary widely in their method of locking the same to the handle as well as the construction or shapes for the uses for which they may be adapted, so it will be understood that while the surgeon's knife has been selected for illustration and description, yet the invention is adapted for knives other than the surgeon's, and that the claims and description, also the illustrations are all to be considered as coming within the limits of the invention.

My present invention is a radical departure from my previous patent above referred to, and is also a radical departure from all such devices used for securing detachable blades to handles. In the present device the locking of the blade by the heel only in the stem end of the handle, is far superior to my prior device, and its simplicity in attaching or removing the blade from the handle, together with the fact that the handle itself can be more readily sterilized. The handle will preferably be constructed of non-corrosive material and the projecting part that holds the blade in position is free to be sterilized to the fullest extent.

With these few advantages pointed out, and with reference to my patent above referred to, the improvement consists in the construction, combination and arrangement of the parts, as will be hereinafter more fully described illustrated in the accompanying drawing, and pointed out in the claims hereunto appended.

The invention as at present preferred will be more clearly understood by reference to the drawings which illustrate merely an example of various means for putting my improvement into practice, and wherein, Figure 1 illustrates a side view of the holder or handle showing in dotted lines an interchangeable flexible blade locked thereto: Figure 2 a rear side view of the same, showing in dotted lines a different style of blade; Figures 3, 4 and 5 merely illustrate a few examples of the various designs of locking means for blades adapted to be fitted to a suitable handle; Figure 6 illustrates the manner of introducing the blade to the handle, parts being removed to more clearly illustrate the manner of affixing the blade in position, the arrow indicating the final movement to lock the same in operating position; Figure 7 is another modification showing the blade when it is in locked position on the handle; and Figure 8 is still another modification of the forms shown above, wherein the overhanging retainer is placed at the end of the blade holding finger while the pivot is set a little further in the rear, but in other respects being practically as illustrated in Figures 1 and 2. Fig. 9 is a cross section through the housing.

The same reference characters throughout the several figures of the drawing will refer to the same parts. With reference to Fig. 1 it will be seen that my invention involves the provision of a metallic handle 9 preferably of non-corrosive material and which may be provided with the usual conveniences for properly holding the same between the thumb and finger, such for instance as being shaped specially with the finger clamping means shown at 10.

The handle, having a flat face on one side provides a secure resting face, with locking means as will be described, the handle proper terminates at 11 otherwise termed the stem, while extending beyond is an elongated finger 12, having one flat side 13 said flat portion being on a central longitudinal line of the handle. As noted the flat face of the finger 13 presents a complete unbroken flat surface for the blade at all times to rest against, the blade being flexed only to slide the heel into the cavity in the handle where the blade will be flat from end to end. The flat face before noted, may be provided on its upper outer end with a slight outward projecting overhang 14, which may or may not extend to the overlapping ear 15, the latter being set a suitable distance away from the flat face of the finger 13 so as to permit a suitably prepared blade to enter between said ear 15 and the flat face of the finger 13, said blade being held from movement while located beneath the ear. At a suitable point thereunder is located a slight projection or pivot 16 about which the blade swings into its position on being introduced to the handle, as will be described further on.

So as to make the knife evenly balanced, it is preferred to round down and suitably shape (as above noted) the opposite side from that which carries the flexible blade, so that the same will offer no obstruction in the handling of the knife, and will be as free as possible from having obstructionable projections to which particles may adhere.

The invention is adapted to use detachable flexible blades 17 made from a thin strip of sheet metal. Such blades may be provided with a straight edge along its upper part, which latter may be provided with a notch 18, the forward wall of which may be inclined as at 19 while its rear wall 20 may be less inclined, the width of said slot suitably fits the pin or pivot 16 under the ear 15. The pivot 16 and the ear 15 holds that portion of the blade to the handle, while the projecting part 14 is adapted to be applied to the extreme end and retains the blade in proper position with relation to the handle or holder.

The blades 17 are made in a number of various shapes for the particular purpose they are to be employed, but in each and every case the blade will consist of a body portion having a notch 18 or its equivalent about its upper edge, while its rear or heel 21, may be provided with any desired locking end, preferably for its simplicity is shown a rectangular end or key 22 for locking it to the handle. The shape and style of the key that is used may be varied as is shown in Figures 3, 4 and 5 provided such handle 9 is provided to receive the heel 21 of the blade in a like cavity 23 in the handle. It will be readily seen that such cavity will have a wall about the same that will at all times under all circumstances retain the blade in proper position to the handle. For the convenience in releasing the blade from its cavity, I provide a finger 24. When pressure is exerted under the same, it will lift the heel out of the cavity and the blade may be removed from the handle by reversing the movement from that explained for inserting the same to the handle. In view of the fact that the cutting pressure will at all times be at the point of the blade, or on the overlap extension 14, on the outer end of the finger 12, and that pressure being upward, it will be readily seen the blade will be securely held by said projecting part 14 as well as being securely locked to the handle by the heel of the blade fitting the cavity 22 in the handle.

My improved detachable blade may be readily secured upon the handle with little inconvenience, and when once locked in position will be held rigidly relative to the handle. With the blade provided with locking means as shown, it provides a safe sure lock for the parts while in their assembled position. By reason of the design of the heel of each blade fitting snugly into a corresponding cavity, affords a smooth unbroken surface with no buttons, pins or other parts to interfere in any way with the work, thus providing a practically smooth surface on each side.

By reason of the three point contact of the blade with the handle, viz, the projecting part 14, pivot 16, and the heel 21 provides a good strong working combination lock from which the blade cannot become loose or detached. Again the blade 17 being of highly tempered flexible steel will be of such thickness as to stand any desired strain that may be exerted upon it, as well as allowing it to be sprung into the cavity.

As has been noted, the handle or holder is so machined as to form a slight sunken flat surface for the whole length of the blade to rest on, on one side, the inner end of the depression terminating in a wall 25 about the cavity 23, as shown to permit the heel of the blade to be firmly held in position without any other locking means. For instance, in Fig. 6 is shown a modification of that shown in Fig. 1. In this latter form of the invention the heel 21 of the blade is provided with a circular end key 27, which fits into a corresponding like cavity 23 and is held in position by reason of the fit together with the neck 28 and 29 on each side of the handle impinging against the neck 30 of the blade. The blade being held locked to the handle in this manner is prevented from movement in any direction, until released by the operator by means of the small projection 24, or other suitable means.

When it is desired to place a blade of a particular kind in the holder, the heel of the blade is grasped and it is laid on the flat depressed side of the finger of the holder, the blade may then be moved in the direction of its length towards the front till the notch 18 on the upper part of the blade comes in contact with the pivot 16 when the blade may then be swung around the pivot in the direction of the arrow 32, until the heel end 21 is in alignment with the cavity, when it will drop in position and be held secure with the handle without any additional locking means, the parts will be so snugly held together as to prevent even to the slightest degree any movement between the two parts locked together. By a slight pressure on the projection 24 or heel of the blade in an upward direction will lift the same clear of the cavity 23 in the handle and the blade may be as readily removed.

Knives have been designed so as to use detachable blades, but they have all had defects of a more or less serious character, such defects comprise particularly projecting parts, such as buttons, pins with greater or less heads thereon and other means, all of which are not only intricate to manufacture by reason of the several points along the finger at which such buttons, pins, etc., are located, and the overhang on such means make the same too costly to manufacture, as well as causing a shortening of the blade, thereby curtailing the cutting surface available, all of such defects have to a great extent prevented such knives from being in general use by those to whom they are applicable.

Another form of locking a flexible blade to the holder as before noted, is shown in Fig. 4, wherein the heel of the blade is provided with a cavity of suitable design that fits into a corresponding locking member carried by the handle or holder. Any of the various designs shown are adapted to be reversed or be applied vice-versa than that shown and described.

In accordance with the provisions of the patent statutes I have herein described the principal form of my invention which I now consider to represent the best embodiment therefore, but I desire to have it understood that the various forms of heel locks are only illustrative and that the invention can be carried out in other ways than those shown and described, but all are intended to come within the scope of the claims. Also, while the design of the blades is shown in various forms, they too may be changed or altered as suggested herein to meet the particular requirement without interfering in any way with the general results for which the locking means was designed to be used.

Having described my invention, what I claim and desire to secure by Letters Patent is:

1. A knife comprising a handle having a pocket at one end portion and in one side face thereof, an extension from said handle in a plane beside that of said pocket, said extension having a stop at its outer end portion projecting at substantially right angles beyond the side of the extension next said pocket of the handle, an ear on said extension inwardly of said stop, said ear comprising a portion extending parallel with said stop and a down turned portion at the free end of the parallel portion, said down turned portion being substantially parallel with the plane of the extension, a pin extending from said extension to the down turned portion of said ear, and a blade having an open under cut notch in the intermediate part of its upper edge to initially engage with said pin and by consequent rocking movement to engage beneath said stop, said blade having a key portion at its inner end conforming to and adapted to snap into said pocket of the handle.

2. A knife comprising a handle having a pocket in one end thereof at its side portion, said pocket being closed above and below but being open towards the end of the handle and at one side thereof, an extension on said handle projecting in a plane coincident with the closed side of said pocket, a stop projecting from the outer portion of said extension, an ear on said extension inwardly of said stop, a pin also carried by said extension, and a blade having a notch made at an inclination in its upper edge for initially engaging with said pin and by subsequent rotation causing the blade to extend in the same general direction as said extension and to rest at its upper outer edge against said stop, the inner end of said blade having a formation complemental to said pocket and adapted to snap laterally thereinto, said ear holding the blade against lateral movement in the same direction as the open side of said pocket, said blade also having a portion projecting therefrom and extending clear of said extension when the blade is in the operative position for bending the blade out of said pocket.

3. A detachable blade knife of the type described comprising a supporting member, a blade mounted for pivotal movement on the supporting member, said supporting member being formed with a recess for receiving a portion of said blade, certain of the walls of the recess being arranged to contact with the opposite edge of the blade to positively confine the same against a turning moment in either a clockwise or counter-clockwise direction, and said blade being inherently flexible for distortion under positive pressure to pass over the said walls of the recess whereby to remove or attach the blade.

4. A detachable blade knife of the type described comprising a handle provided with a recess and formed with an elongated extension having a face arranged in the same plane as the base wall of the recess, a blade adapted to be disposed to lie upon the face of the extension and the base wall of the recess, the side walls of the recess being formed to contact with opposite edges of the blade whereby to positively confine the same against a turning moment either in a clockwise or a counter-clockwise direction, and said blade being inherently flexible for distortion under positive pressure to pass over the said walls of the recess whereby to remove or attach the blade.

In testimony whereof I affix my signature.

EDWARD H. LANGBEIN.